United States Patent [19]

Taylor et al.

[11] Patent Number: 4,641,028

[45] Date of Patent: Feb. 3, 1987

[54] NEUTRON LOGGING TOOL

[76] Inventors: James A. Taylor, 4213 Bonham, Odessa, Tex. 79762; Kenneth G. Taylor, 926 W. 38th, Odessa, Tex. 79764

[21] Appl. No.: 578,710

[22] Filed: Feb. 9, 1984

[51] Int. Cl.$^4$ .............................................. G01V 5/10
[52] U.S. Cl. .................................... 250/266; 250/269
[58] Field of Search ............... 250/264, 265, 266, 262, 250/269

[56] References Cited

U.S. PATENT DOCUMENTS

| | | | |
|---|---|---|---|
| 2,741,705 | 4/1956 | McKay | 250/266 |
| 4,005,290 | 1/1977 | Allen | 250/266 |
| 4,021,666 | 5/1977 | Allen | 250/265 |
| 4,286,150 | 8/1981 | Allen | 250/269 |
| 4,379,228 | 4/1983 | Allen | 250/266 |

Primary Examiner—Alfred E. Smith
Assistant Examiner—Carolyn E. Fields

[57] ABSTRACT

A well logging instrument for use in a cased well bore and containing a sealed source of fast neutrons and two identical thermal neutron detectors with a volume of four atmospheres of helium-3 gas. The formation surrounding the cased well bore is bombarded with high energy neutrons and the two thermal neutron detectors are spaced apart from one another and from the source to receive slowed down or thermal neutrons from the surrounding formations. The epithermal or fast neutrons striking the formation are slowed down by fluids containing great quantities of hydrogen or chlorine atoms, creating thermal or slow neutrons, which the detectors respond to logrithmically, but independently. The counting rate of the detectors are processed independently to count rate meters and to a recorder to present two outputs of information. The presence or absence of hydrogen and chlorine atoms in the formations as detected by each detector determines the amount of sweep or deflection of each recorder pen. By calibrating each output of the detectors to the other, in known formations, the long spaced curve will deflect to the right of the short spaced curve in water bearing zones and deflect to the left of the short spaced curve in oil bearing zones. In dense zones of very low porosity or non-fluid bearing or impermeable formations, the curves will track each other as the ratio of the two counting rates are equal to the ratio of the sensitivities in this situation or condition.

12 Claims, 6 Drawing Figures

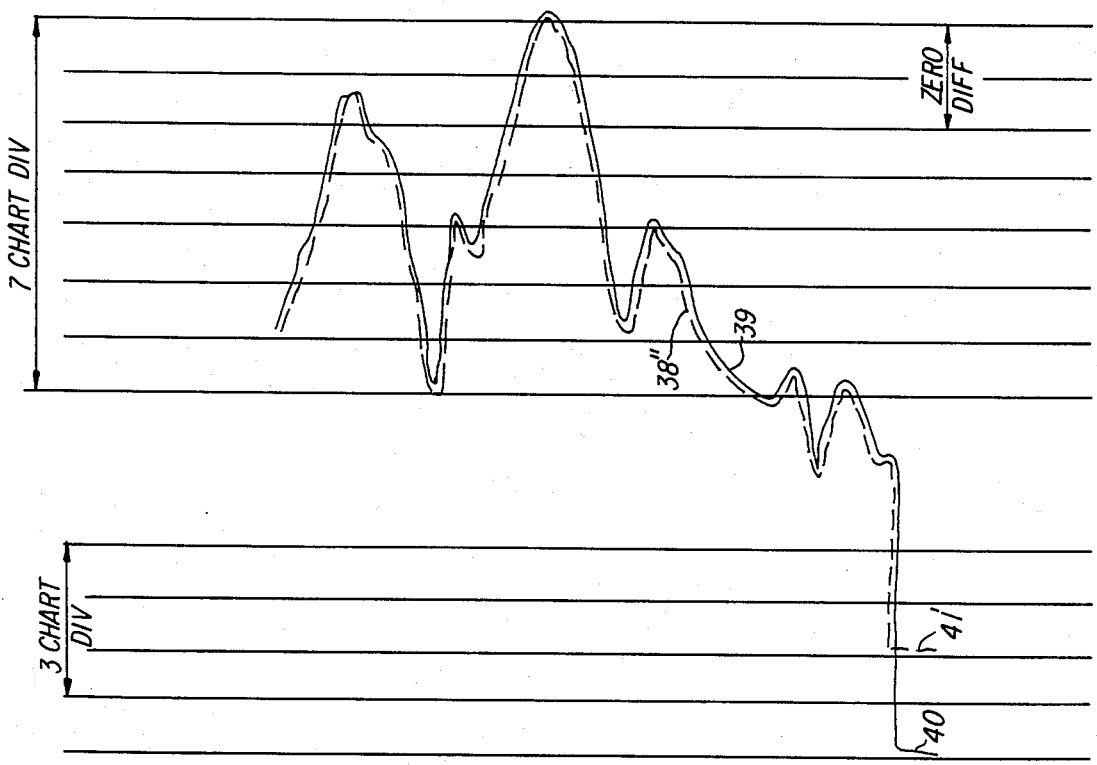

NEUTRON LOGGING TOOL

BACKGROUND OF THE INVENTION

This invention relates generally to radioactivity well logging methods and apparatus for investigating subsurface earth formations by neutron logging techniques, and more particularly, to a new and improved methods of determining oil and water bearing formations of the earth traversed by a well bore.

In the prior art of neutron logging, a fast neutron source on a logging tool irradiates the formations surrounding an open or uncased borehole. The resulting secondary radiation within the borehole is measured by two thermal neutron detectors longitudinally spaced from one another and from the source. By proper spacing of the detectors and the source, formation porosity can be determined from the counts generated by the detectors. One such system is illustrated in U.S. Pat. No. 4,004,147 issued to L. S. Allen.

A two group neutron diffusion theory describes the secondary radiation as being epithermal and thermal neutrons. The thermal neutron parameter of the formation typically is related to porosity but is strongly affected by the total macroscopic absorption cross section of the formation, that is, both the rock matrix and the fluids within the formation.

The macroscopic absorption cross section of the formation fluid is affected by the salinity of the fluid and is significantly reduced when the pore spaces of the formation contain salt water rather than oil. The chlorine present in the salt water has a large macroscopic absorption cross section for thermal neutrons and, consequently, reduces the number of thermal neutrons returning to the borehole as secondary radiation.

This present invention is not concerned with determination of porosity but rather producing a direct reading response identifying movable oil and movable water by a pair of special low atmosphere gas thermal neutron detectors in a logging tool and employing a new and different system of operation of the setup or calibration of the two neutron detectors outputs to the recording device.

SUMMARY OF THE INVENTION

The present invention provides method and apparatus for determining movable oil bearing and water bearing formations. The logging system includes a gamma ray tool for log correlation and lithology, a casing collar locator for depth control measurements in casing, and two spaced apart thermal neutron detectors located a fairly large distance from a sealed neutron source.

More particularly, a source of fast neutrons from a fairly large neutron source is used to irradiate the formations surrounding a borehole. The neutron source is a steady state AmBe fast neutron source with an average energy of about Four Million Electron Volts. The secondary radiation from the formations is measured at two spaced apart detectors which are especially sensitive to thermal neutrons and the macroscopic absorption cross section of the formations. The detectors are identical and contain a low volume of helium-3 gas (four atmospheres) so that the detectors are greatly affected by the thermal neutron parameter of neutron flux and thus indicate the type of fluids in the formations by virtue of the response principally to the macroscopic absorption cross section of the formations.

In operation, each of the detectors is normalized to identical sensitivity of response at the earth's surface. Next, the tool is located in a well bore relative to a very dense (low porosity) formation and a log showing the response of the long spaced detector (the one farthest from the source) and showing the response of the short spaced detector (the one closest to the source) as a function of depth is recorded. The log typically has lengthwise extending lines which are horizontally spaced from one another where the spacing between the vertical lines is commonly referred to as a "chart division". In the dense formation, the long spaced detector typically produces a smaller response in terms of chart divisions than the short spaced detector. The ratio of the response of the short spaced detector to the long spaced detector is multiplied by the sensitivity of the long spaced detector and the curves are set to track one another, each curve having a different zero reference but a similar sensitivity. Thereafter, when the section of formations of interest is logged as a function of depth, the long spaced detector will produce a curve to the left of the short spaced curve in oil bearing formations and will produce a curve to the right of the short spaced curve in water bearing formations. In dense zones of very low porosity or non-fluid bearing formations the two curves will track one another.

BRIEF DESCRIPTION OF THE DRAWINGS

FIGS. 4a, 4b and 4c are an illustration of the individual curves of FIG. 3 and showing their relationship in various steps of the method.

DESCRIPTION OF THE PREFERRED EMBODIMENT

Figure 1:
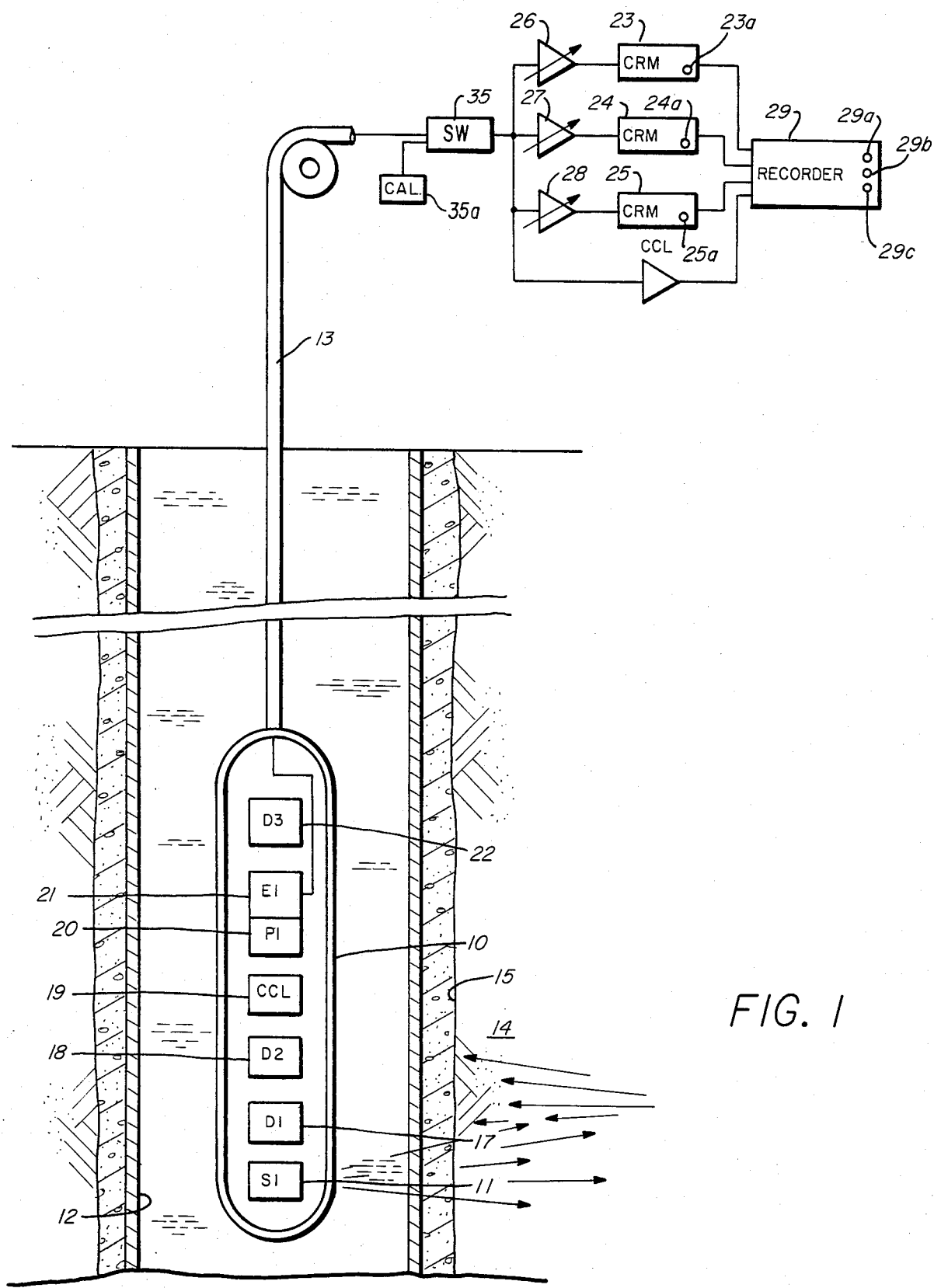
FIG. 1 is a simplified illustration of a wellbore and logging system showing the apparatus of the present invention.

The present invention is directed toward a method and system of dual neutron logging for determining and identifying oil and water bearing formations. In FIG. 1, a formation logging tool 10 carries a sealed neutron source 11 is adapted to be passed through a cased well bore 12 by means of an armored cable 13. The cased well bore 12 is cemented in place in a borehole 15 which traverses earth formations 14. The source 11 is a steady state AmBe neutron source with an average energy of about four million electron volts. While a cased borehole is illustrated, the borehole need not be cased for operation of the present invention.

Above the source 11 are longitudinal spaced thermal neutron detectors 17 and 18. Detectors 17 and 18 are the helium-3 gas type and are filled with four atmospheres of the gas. Detector 17 is 20½ inches from the source 11 while detector 18 is 25½ inches from the source 11. The detectors are matched in size and response characteristics. A gamma ray detector 22 and casing collar locator 19 are also disposed in the tool 10.

A power supply 20 and electronic circuit means 21 are both located within the tool for supplying power to the detectors 17 and 18 and for amplifying the signals from the detectors 17,18 and 22. The amplified signals are coupled to the cable 13 to carry the signals to surface count rate meters 23, 24 and 25. The neutron detector signals from detectors 17 and 18 are applied to separate count rate meters 24 and 25. The gamma ray signal from the gamma ray detector 22 is also applied to an independent count rate meter 23. The casing collar locator 19 also provides a signal for recording on the log as a function of depth.

The count rate meters 23-25 employ a digital type discriminator or bias level circuits 26-28 which are conventional and control the sensitivity of the response of the meters 23-25. The output of the count rate meters 23-25 are controlled by precision ten-turn potentiometers 23a-25a for precise setting of the sensitivities of the meters. The output of the meters 23-25 is supplied to a conventional recorder 29 which produces a log 30 (FIG. 2) as a function of depth.

The log 30 has vertical lines which represent count rates and horizontal lines which represent depth measurements. The curve 31 is the conventional gamma ray curve and is typically disposed to the left side of the depth marking column on the log. The short spacing curve 32 is produced on the log 30 as a solid line to the right of the depth column while the long spacing curve 33 is produced on the log 30 as a dashed line. The long spacing curve is produced by the count rate of the long spaced detector and the short spaced curve is produced by the count rate of the short spaced detector. The casing collar produces pips 36 along the right side of the log 30 which are indicative of the location of collars in the casing.

The method and use of the present invention includes a calibration of both neutron curves to an output calibration circuit of the panel and a calibration of each curve to a dense or minimum porosity formation.

In the first step of the method, the short and long spaced curves 32 and 33 are zeroed on the right side of the log 30 by using a zero or grounded condition of the count rate meters of the panel at the surface. Next, the switch 35 is set to a calibrate position to connect a calibrate circuit 35a of the panel to the rate meters 23-25. The calibrate circuit 35a is used to supply a known output voltage to the long and short spaced count rate meters 24 and 25. Identical sensitivity levels set by the output sensitivity potentiometers 24a and 25a will deflect the two curves on the logging paper in the recorder over a span of 5 inches or 20 chart divisions on the logging paper. If the span deflections are not equal then adjustment of the span sensitivity pots 29a and 29b can be made until identical span recordings on the logging paper are obtained. Thus, the first step is a calibration to use a known calibration value at the earth's surface to drive the count rate meters 24 and 25 to produce exactly the same span of deflection on the log in response to a known signal.

Now the surface calibration is complete and the panel function switch 35 is set to the log position so that the recorder and panel are connected to the logging cable and logging tool. The recorder also indicates depth of the tool in the well bore on the log paper as the tool is moved through the well bore.

In the next steps of the method, the dual neutron tool 10 is started downhole in the well bore until a dense or very low porosity section of earth formations is located. This may be identified by the highest counting rate or the most deflection to the right on the logging paper by the neutron curves 32 and 33. When the dense formation is located, the long and short spaced curves 32 and 33 are adjusted by the sensitivity controls on the meters 24a and 25a so that each of the output sensitivity of the count rate meters 24 and 25 are the same value and the span of the short space curve is approximately two-thirds of the total span across the width of the section of log paper on which the curves 32, 33 are recorded. This step is exactly the same as the zero procedure used at the earth's surface with both curves having a common zero reference point. This is generally adequate to maintain the recording within the side boundaries of the log paper. This is in contrast to a porosity log where the calibration there is to linearize the porosity indication on the chart.

Figure 3:
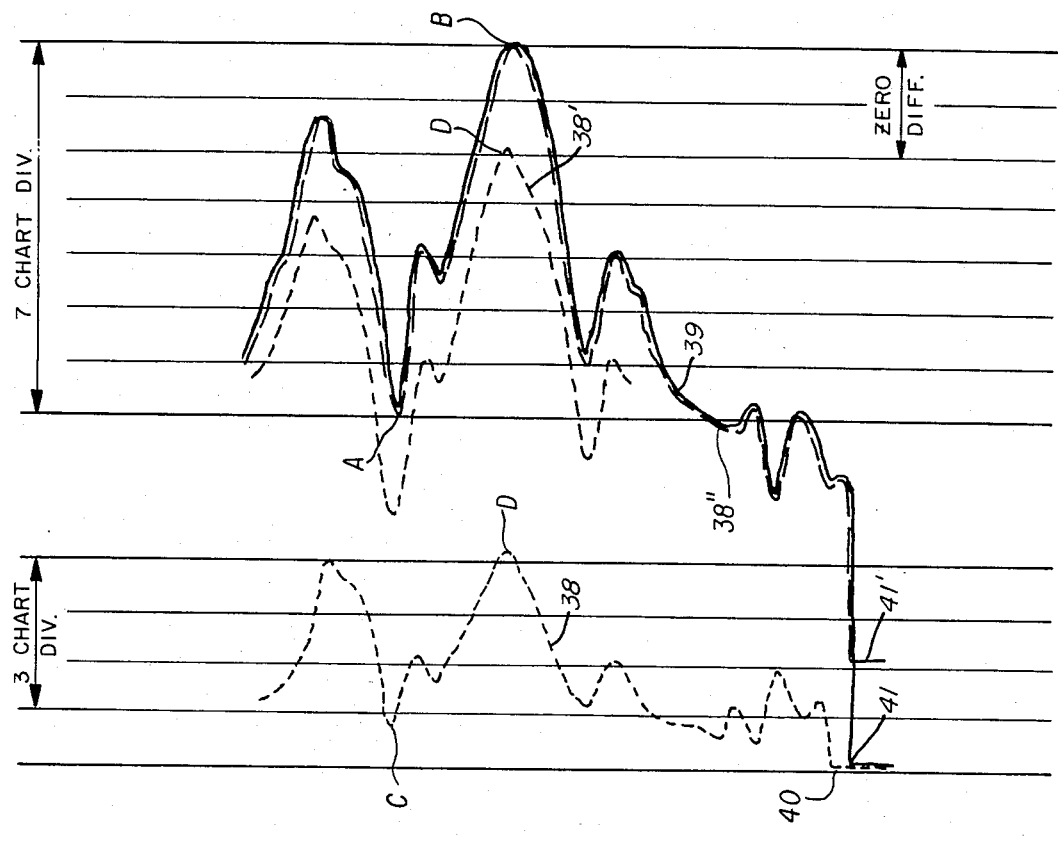
FIG. 3 is an illustration of a log with curves obtained prior to and after adjustment of sensitivity of the response.
Figure 4B:
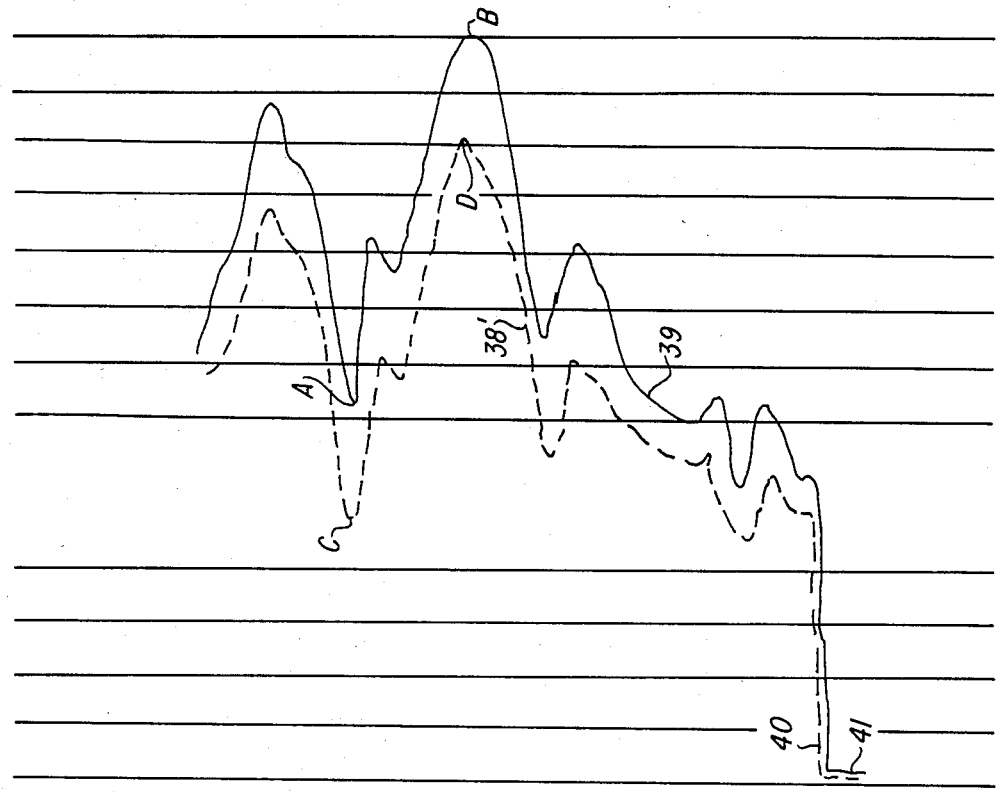
Figure 4A:
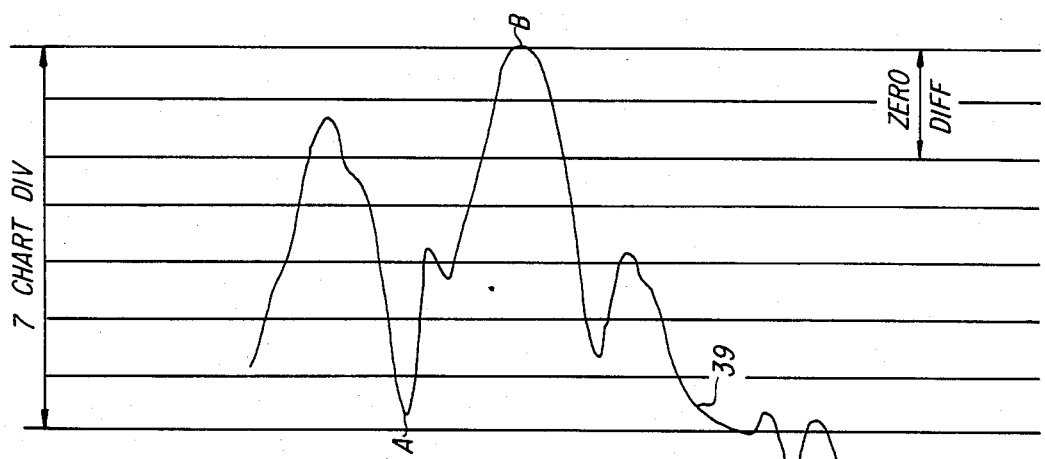
Figure 4A:
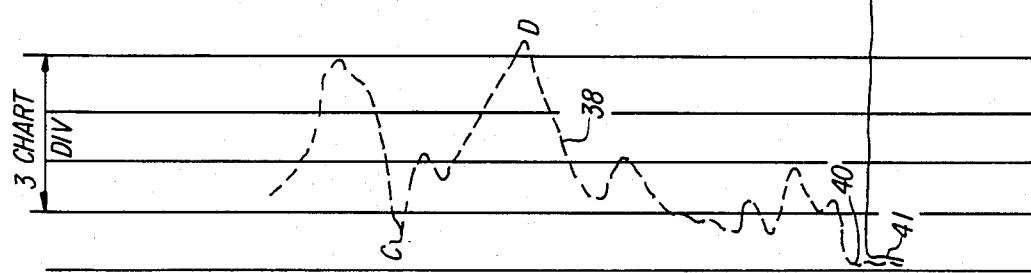

Continuing the calibration procedure, a log is now run in the upward direction in the well bore at about 25 feet per minute, until the interval of dense formation has been covered. This produces two curves 38 and 39 as shown in FIG. 3 and FIG. 4a. The long spaced curve 38 will deflect less than the short spaced curve 39 using the same value of output sensitivities in the rate meter, and it is this difference in the deflection between the curves that is used to calibrate a true logging sensitivity for logging the entire well bore.

For example: With respect to FIG. 3 and FIG. 4a if the short spaced curve 39 deflected 7 chart divisions from peak A to peak B on the curve 39 and the long spaced curve 38 deflected 3.5 chart divisions from peak C to peak D on the curve 38, then dividing 7 by 3.5 results in a ratio of 2.0. The zero base 40 for the curve 38 and the zero base 41 for the curve 39 are at the same location at this time. The long spaced curve output sensitivity value is multiplied by the ratio 2.0 to give a new value of the output sensitivity of the long spaced curve, which is comparable to the sensitivity of the short spaced curve. As shown in FIG. 4b, the short spaced curve 39 on the log output has a sensitivity which remains at the initial two-thirds value of the total span across the paper. By establishing the ratio of 2.00 to 1, and adjusting the output sensitivity (increasing) of the long spaced curve 38', the new value of the output sensitivity of the long spaced curve 38' is comparable with the sensitivity of the short spaced curve 39. Now, and adjusting the long spaced curve zero point 41 to a new value 41', the two curves 38 and 39 will be superimposed over one another in the dense section of the earth formations. As shown by curves 38" and 39 in FIG. 4c. The adjustment of the zero point from 41 to 41' is determined by the number of chart divisions between points A and C or points B and D.

The well is then logged upward or from bottom to top at about 25 feet per minute. The long spaced curve is usually identified by making it a dashed or dotted curve, while the short spaced curve is a solid line.

Under the directions described above for calibration to the earth formations, the curves 32 and 33 (see FIG. 2) will determine immediately as the log is produced, whether the fluids in the formation are oil or water. In an oil bearing formation, (for example, from 4398 to 4410 feet in FIG. 2) the long spaced curve will read to the left of the short spaced curve, and in a water bearing formation, (for example, from 4410 to 4476 feet) the long spaced curve will cross over and read to the right of the short spaced curve. In a fluid immovable formation the two curves will read the same or stack each other (for example, from 4328 to 4326 feet).

The simultaneous gamma ray log 31 is also run to record lithology as well as a casing collar locator log for depth control.

The ratio of the two neutron curves is constantly changing as the log is pulled up the wellbore. When the ratio of the two counting rates is equal to the ratio of the log sensitivities of the ratemeters, then the curves will respond by stacking peak to peak. While it is not understood why, as the transition from oil to salt water occurs, the ratio of the short spacing curve to the long spacing curve decreases which is opposite to what would ordinarily be expected. However, repeated logs have been run with exactly the same results of indicating oil and water in formations behind the casing.

Figure 2:
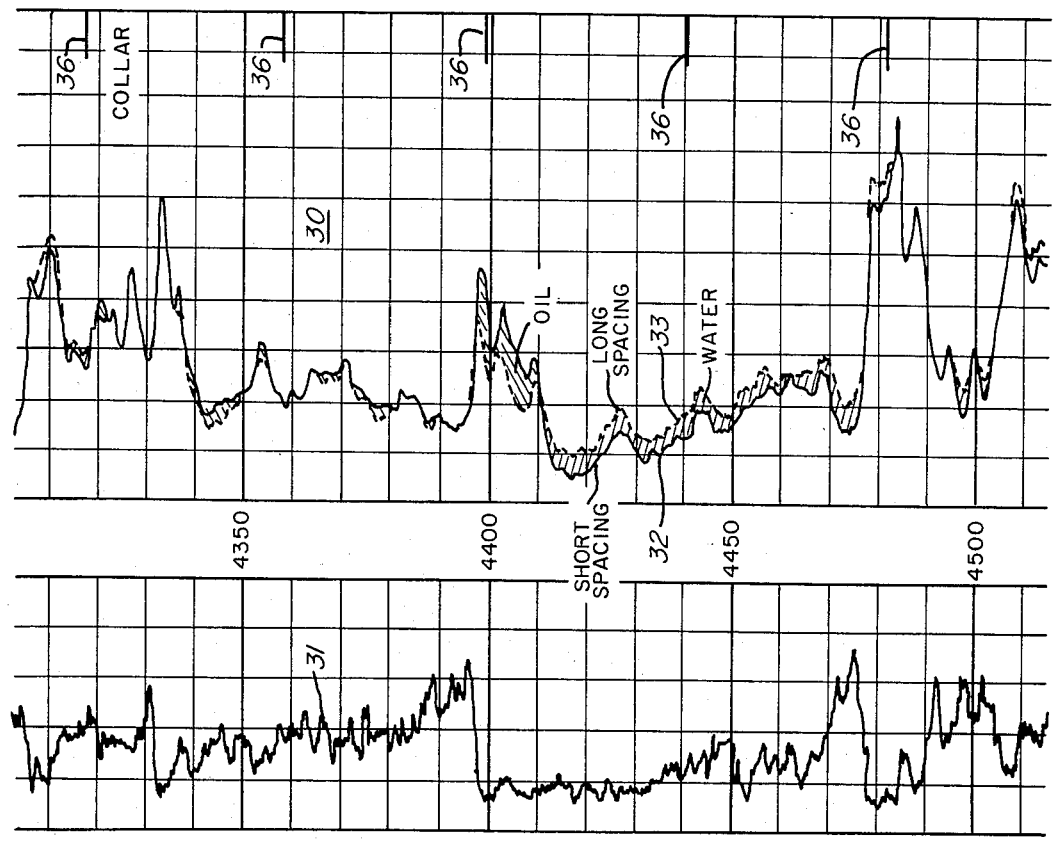
FIG. 2 is an illustration of a log obtained by using the invention, and which identifies oil and water bearing zones of the formation.

While the foregoing description contemplates a specific type of apparatus to obtain the log as shown in FIG. 2, with the sophisticated equipment presently available it is possible to run the tool and record the raw data from the tool and process the data in a computer to obtain the correction of sensitivities and zero points and produce the results of a log such as shown in FIG. 2.

As a further step in the process, after obtaining the log of FIG. 2, the sensitivity of the recorder can be altered to cause the curves 32 and 33 to track at the minimum point or spread of the curves for an oil bearing zone. By this adjustment and a rerun of the tool through the well bore, the spread of the curves will indicate the relative intensity of the oil potential in the oil bearing zones along the length of the borehole.

It will be apparent to those skilled in the art that various changes may be made in the invention without departing from the spirit and scope thereof and therefore the invention is not limited by that which is enclosed in the drawings and specifications, but only as indicated in the appended claims.

We claim:

1. A method of logging earth formations traversed by a well bore and utilizing a logging tool having a neutron source and a short spaced and a long spaced thermal neutron detector which produce an independent response as a function of depth of the logging tool in a well bore, comprising the steps of:

moving the logging tool through a well bore to locate a section of the earth formations which has minimum porosity and obtaining measurement responses from each of said long and short spaced detectors;

normalizing the responses of the long and short spaced detectors by matching the sensitivity of response of the long spaced detector to the sensitivity of response of the short spaced detector for an earth formation which has minimum porosity so that the normalized responses track one another in an earth formation which has minimum porosity;

moving the tool over the length of the well bore to be surveyed while recording the normalized responses of the long and short spaced neutron detectors as a function of depth;

comparing the normalized responses of the long and the short spaced neutron detectors on the basis that the normalized responses match for dense and low porosity formations and that a hydrocarbon bearing formation is indicated when the long spaced response is less than the short spaced response and that a water bearing formation is indicated when the long spaced response is greater than the short spaced response.

2. The method as defined in claim 1 wherein the short spaced detector is approximately 20½ inches from the source and the long spaced detector is approximately 25½ inches from the source.

3. The method as defined in claim 2 wherein said normalizing step includes adjusting both the sensitivity and zero point of the long spaced measurement.

4. A method of logging earth formations traversed by a well bore and utilizing a logging tool having a neutron source and a short spaced and a long spaced thermal neutron detector which produce an independent short spaced curve and a long spaced curve on a log chart in a recorder as a function of depth of the logging tool in a well bore, comprising the steps of:

adjusting the response of the recorder with a predetermined calibration pulse rate to obtain identical responses on the log chart for the short spaced curve and the long spaced curve;

moving the logging tool through a well bore while the short spaced detector and the long spaced detector are coupled to the adjusted recorder and observing the independent responses of said long and short spaced detectors on the recorder until a section of the well bore is located where the earth formations have minimum porosity;

determining the response from each of the long and short spaced neutron detectors while the logging tool is in the section of the well bore where the earth formations have minimum porosity and obtaining a ratio of the two responses;

increasing the output sensitivity of the response of the long spaced neutron detector by the factor of the ratio obtained;

moving the logging tool over the same section of well bore and adjusting the zero base line of the long spaced response so that the short spaced and long spaced curves track peak to peak;

moving the logging tool over the length of the well bore to be surveyed while recording the responses of the long and short spaced neutron detectors as a function of depth so that a hydrocarbon bearing formation is indicated when the long spaced response is less than the short spaced response and so that a water bearing formation is indicated when the long spaced response is more than the short spaced response and so that the responses are identical for formations which are dense or low porosity.

5. The method as defined in claim 4 wherein the short spaced detector is approximately 20½ inches from the source and the long spaced detector is approximately 25½ inches from the source.

6. The method as defined in claim 2 after recording the responses of the long and short spaced neutron detectors as a function of depth, and the further step of:

normalizing the zero point of the long spaced response at the location in the hydrocarbon bearing formation which has the least amount of deviation with respect to the short spaced response to match the responses; and moving the tool over the length of the well bore to be surveyed while recording the responses of the long and short spaced neutron detectors as a function of depth so that the relative potential of the hydrocarbon bearing formations is indicated by the degree of deviation of the long spaced response with respect to the short spaced response.

7. The method as defined in claim 6 wherein the short spaced detector is approximately 20½ inches from the source and the long spaced detector is approximately 25½ inches from the source.

8. A method of logging earth formations traversed by a well bore and utilizing a logging tool having a neutron source and a short spaced and long spaced thermal neutron detector which produce an independent response as a function of depth of the logging tool in a well bore, comprising the steps of:

moving the logging tool through a well bore to locate a section of the earth formations which has minimum porosity and obtaining measurement responses from each of said long and short spaced detectors in the section of earth formation which has minimum porosity;

recording the long spaced and short spaced detector measurement responses as a function of depth in the section of earth formations which have minimum porosity;

normalizing the responses of the long and short spaced detectors by matching the sensitivity of response of the long spaced detector to the sensitivity of response of the short spaced detector for an earth formation which has minimum porosity so that the normalized responses track one another in an earth formation which has minimum porosity;

comparing the normalized responses of the long and the short spaced neutron detectors on the basis that the normalized responses match for dense and low porosity formations and that a hydrocarbon bearing formation is indicated when the long spaced response is less than the short spaced response and that a water bearing formation is indicated when the long spaced response is greater than the short spaced response.

9. The method as defined in claim 8 wherein the short spaced detector is approximately 20½ inches from the source and the long spaced detector is approximately 25½ inches from the source.

10. The method as defined in claim 9 wherein said normalizing step includes adjusting both the sensitivity and zero point of the long spaced measurement.

11. A method of logging earth formations traversed by a well bore and utilizing a logging tool having a neutron source and a short spaced and a long spaced thermal neutron detector which produce an independent response as a function of depth of the logging tool in a well bore, comprising the steps of:

normalizing the responses of the long and short spaced detectors by matching the sensitivity of response of the long spaced detector to the sensitivity of response of the short spaced detector for an earth formation which has minimum porosity so that the normalized responses track one another in an earth formation which has minimum porosity;

moving the tool over the length of the well bore to be surveyed while recording the normalized responses of the long and short spaced neutron detectors as a function of depth;

comparing the normalized responses of the long and the short spaced neutron detectors on the basis that the normalized responses match for dense and low porosity formations and that a hydrocarbon bearing formation is indicated when the long spaced response is less than the short spaced response and that a water bearing formation is indicated when the long spaced response is greater than the short spaced response.

12. The method as defined in claim 11 wherein the short spaced detector is approximately 20½ inches from the source and the long spaced detector is approximately 25½ inches from the source.

* * * * *